(12) United States Patent
Doi (10) Patent No.: US 9,838,549 B1
(45) Date of Patent: Dec. 5, 2017

(54) IMAGE FORMING APPARATUS, IMAGE FORMING SYSTEM, AND NOTIFICATION METHOD (71) Applicants: KABUSHIKI KAISHA TOSHIBA, Tokyo (JP); TOSHIBA TEC KABUSHIKI KAISHA, Tokyo (JP)

(72) Inventor: Yayoi Doi, Mishima Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/277,396

(22) Filed: Sep. 27, 2016

(51) Int. Cl.
| | |
|---|---|
| G06F 15/00 | (2006.01) |
| G06F 3/12 | (2006.01) |
| G06F 1/00 | (2006.01) |
| G06K 15/00 | (2006.01) |
| G06K 1/00 | (2006.01) |
| H04N 1/00 | (2006.01) |

(52) U.S. Cl.
CPC ..... *H04N 1/00037* (2013.01); *H04N 1/00015* (2013.01); *H04N 1/00076* (2013.01); *H04N 1/00204* (2013.01); *H04N 2201/0082* (2013.01)

(58) Field of Classification Search
CPC ........... H04N 1/00037; H04N 1/00015; H04N 1/00076; H04N 1/00204; H04N 2201/0082

USPC ............................. 358/1.113, 1.14, 1.15, 1.1
See application file for complete search history.

(56) References Cited

U.S. PATENT DOCUMENTS

| | | | | |
|---|---|---|---|---|
| 2013/0028616 | A1* | 1/2013 | Kunihiro | ............... G06F 3/1204 399/27 |
| 2016/0165077 | A1* | 6/2016 | Shibata | .............. H04N 1/00344 358/1.15 |
| 2016/0255221 | A1* | 9/2016 | Takahashi | .......... H04N 1/00477 |

FOREIGN PATENT DOCUMENTS

JP          2012-210783          11/2012

* cited by examiner

*Primary Examiner* — Douglas Tran
(74) *Attorney, Agent, or Firm* — Patterson & Sheridan, LLP (57) ABSTRACT

An image forming system includes an image forming apparatus and a first storage unit that stores registree information of users registered to work on the image forming apparatus. The image forming apparatus includes a processor programmed to determine whether or not work needs to be performed on the image forming apparatus by a worker based on a predetermined condition, obtain presence information of a registree from a second storage unit, the presence information indicating the presence state of the registree, identify one or more registrees associated with the work to be done, in a case where work needs to be done on the image forming apparatus by a worker, and upon determining that one or more registrees is present, perform a notification process that notifies one of the present registrees that work needs to be done on the image forming apparatus.

20 Claims, 5 Drawing Sheets

IMAGE FORMING APPARATUS, IMAGE FORMING SYSTEM, AND NOTIFICATION METHOD

FIELD

Embodiments described herein relate generally to an image forming apparatus, an image forming system, and a control method.

BACKGROUND

In the related art, a user performs maintenance work on an image forming apparatus such as a multifunction peripheral in a case where consumables are required to be replaced or refilled. Maintenance work means replacing or refilling consumables of the image forming apparatus. In this case, the image forming apparatus displays information that prompts the user to perform maintenance work, on a display included in the image forming apparatus. In addition, in this case, the image forming apparatus notifies the user by an alert sound that maintenance work is required to be performed. Consumables of the image forming apparatus include, for example, sheets on which images are formed, staples, developers such as toner, and photoreceptor drums.

The image forming apparatus in the related art, however, may not be able to notify a proper person that maintenance work is required to be performed. Consequently, maintenance work may not be efficiently performed on the image forming apparatus.

DETAILED DESCRIPTION

In general, according to one embodiment, an image forming system includes an image forming apparatus and a first storage unit that stores registree information of users registered to work on the image forming apparatus. The image forming apparatus includes a processor programmed to determine whether or not work needs to be performed on the image forming apparatus by a worker based on a predetermined condition, obtain presence information of a registree from a second storage unit, the presence information indicating the presence state of the registree, identify one or more registrees associated with the work to be done, in a case where work needs to be done on the image forming apparatus by a worker, and upon determining that one or more registrees is present, perform a notification process that notifies one of the present registrees that work needs to be done on the image forming apparatus.

Hereinafter, an image forming apparatus 100 of an embodiment will be described with reference to the drawings. The same configurations will be designated by the same reference signs in each drawing.

Outline of Image Forming Apparatus

First, an outline of the image forming apparatus 100 will be described. Hereinafter, the image forming apparatus 100 will be illustratively described in a case where the image forming apparatus 100 is located in an office. The office in this example is a room or a building in which a user who uses the image forming apparatus 100 works. The image forming apparatus 100 may be located in another indoor location such as an indoor event venue and a private room or building instead of the office. The image forming apparatus 100 may be located in another outdoor location such as an outdoor event venue instead of the office.

An administrator stores in advance registree information in the image forming apparatus 100. The administrator in this example is an administrator of the image forming apparatus 100. The registree information indicates a registree. The registree is a person who is permitted by the administrator to register as a registree in the image forming apparatus 100. Hereinafter, the registree will be illustratively described in a case where the registree is a worker who is selected by the administrator as a person performing maintenance work. The maintenance work in this example is work of replacing or refilling consumables. The consumables in this example are consumables of the image forming apparatus 100. That is, the registree is a person who knows where a storage location is. The storage location in this example is a location where the consumables are stored in the office.

The registree may be a person who knows a contact address of a worker performing the maintenance work on the image forming apparatus 100. The registree may be the administrator or a different person provided that the registree is a person who is permitted by the administrator to register as a registree in the image forming apparatus 100. The different person in this example is a person working in the office and may be a person working outside of the office.

The image forming apparatus 100 determines whether or not a predetermined condition is satisfied. The predetermined condition is a condition related to the state of the image forming apparatus 100. The predetermined condition will be described later. The image forming apparatus 100 obtains presence information in a case where the predetermined condition is determined to be satisfied. The presence information in this example indicates the presence state of the registree indicated by the registree information which is stored in advance in the image forming apparatus 100. The presence information indicates either the presence of the registree or the absence of the registree, and is referred to herein as the presence state. The presence of the registree is a state where the registree is present on a predetermined seat. The absence of the registree is a state where the registree is not present on the predetermined seat. The predetermined seat is, for example, determined in advance in the office and is a seat on which the registree sits. The image forming apparatus 100 performs a different process according to the obtained presence information. Accordingly, the image forming apparatus 100 allows work to be efficiently performed in accordance with the state of the image forming apparatus 100 according to the presence state of a proper person. The proper person is, for example, a worker who is selected by the administrator as a person performing the maintenance work. That is, the proper person in this example is the registree registered in the image forming apparatus 100.

Details of Image Forming Apparatus

Hereinafter, details of the image forming apparatus 100 will be described with reference to FIG. 1.

Figure 1:
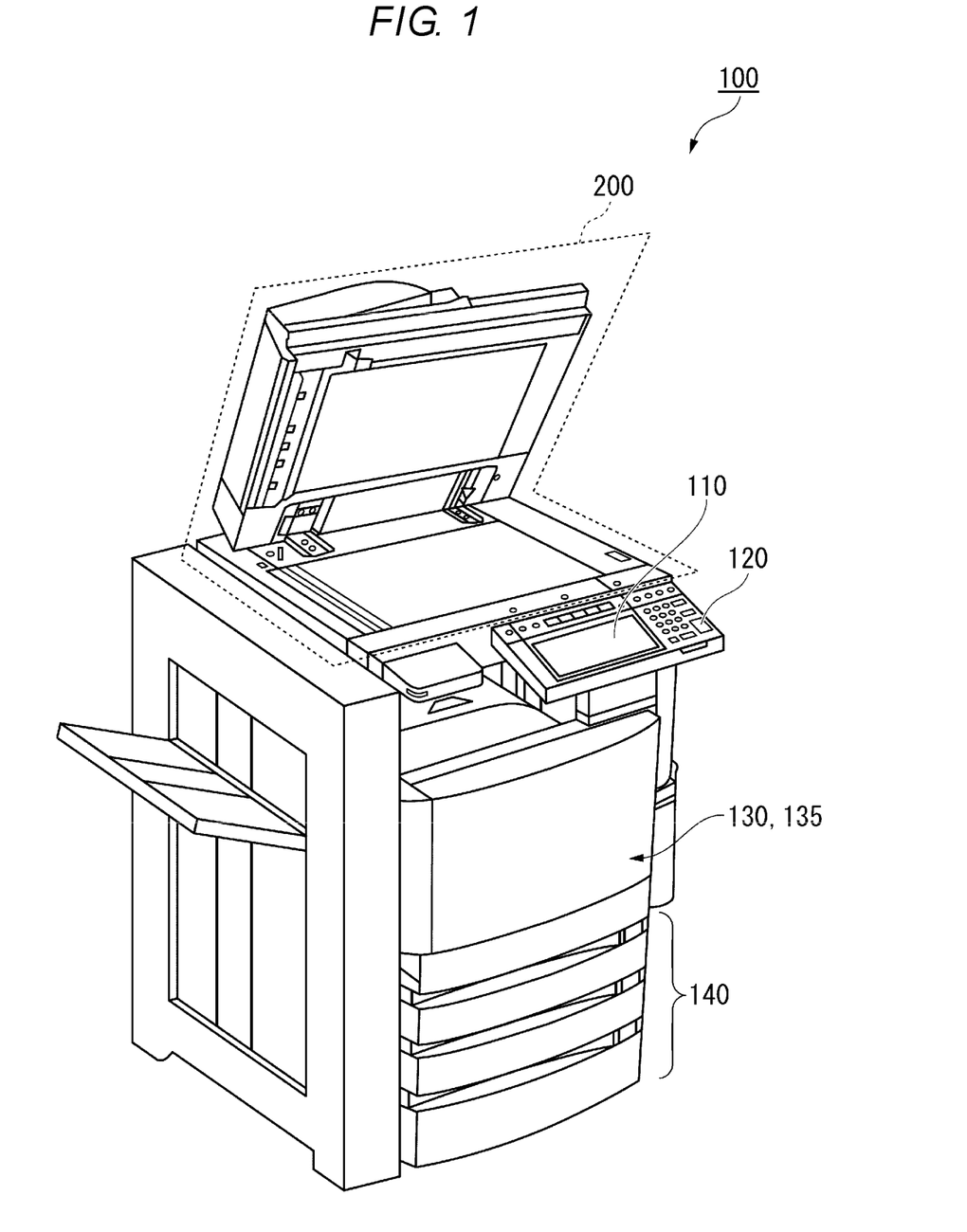
FIG. 1 is an exterior view illustrating an overall configuration example of an image forming apparatus according to an embodiment.

FIG. 1 is an exterior view illustrating an overall configuration example of the image forming apparatus 100 according to the embodiment. The image forming apparatus 100 is, for example, a multifunction peripheral. The image forming apparatus 100 includes a display 110, a control panel 120, a printer unit 130, a developer accommodation unit 135, a sheet accommodation unit 140, and an image reading unit 200. The printer unit 130 of the image forming apparatus 100 may be a device of an electrophotographic type that fixes toner images or may be a device of an inkjet type.

The image forming apparatus 100 forms images on a sheet using a developer such as toner. The sheet is, for example, paper. The sheet may be of any type such as label paper provided that the image forming apparatus 100 can form images on the surface thereof.

The display 110 is an image display device such as a liquid crystal display and an organic Electro Luminescence (EL) display. The display 110 displays various information related to the image forming apparatus 100. The display 110 is one example of a first display unit.

The control panel 120 includes a plurality of buttons. The user performs an operation on the control panel 120. The control panel 120 outputs a signal corresponding to the operation performed by the user to a control unit of the image forming apparatus 100. The display 110 and the control panel 120 may be configured as a single body touch panel.

The printer unit 130 forms images on the sheet based on image information generated by the image reading unit 200 or image information received through a communication line. The printer unit 130 performs, for example, the following processes to form images. The printer unit 130 forms an electrostatic latent image on a photoreceptor drum based on the image information. The printer unit 130 causes a developer to attach to the electrostatic latent image and thereby forms a visible image. Toner is a specific example of the developer. The printer unit 130 transfers the visible image onto the sheet. The printer unit 130 applies heat and pressure to the sheet, whereby fixes the visible image on the sheet. The sheet on which images are formed may be a sheet accommodated in the sheet accommodation unit 140 or a sheet manually inserted.

The developer accommodation unit 135 accommodates the developer that is used to form the visible image in the printer unit 130.

The sheet accommodation unit 140 accommodates the sheet that is used to form images in the printer unit 130.

The image reading unit 200 reads image information of a reading target that is formed on an original document. The image reading unit 200 stores the read image information. The stored image information may be sent to another information processing apparatus through a network. The stored image information may be formed as an image on the sheet by the printer unit 130.

Functional Configuration of Image Forming Apparatus

Hereinafter, a hardware configuration of the image forming apparatus 100 and server S1, S2, S3 will be described with reference to FIG. 2.

Figure 2:
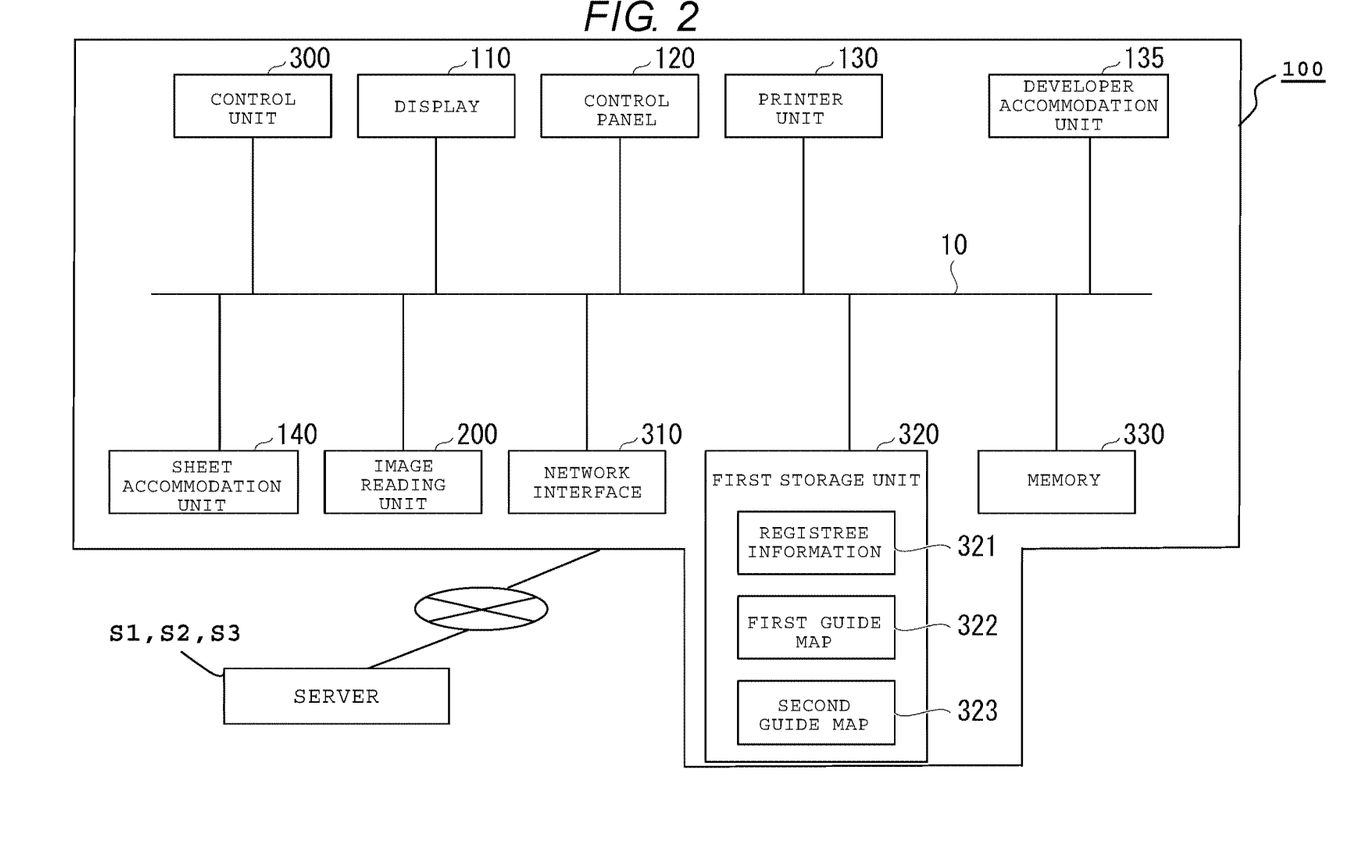
FIG. 2 is a diagram illustrating a functional configuration example of the image forming apparatus.

FIG. 2 is a diagram illustrating a functional configuration example of the image forming apparatus 100 and servers S1, S2, S3. FIG. 2 is an example of an image forming system in which the image forming apparatus and servers are connected through a network.

Each server includes a storage device in which a variety of information is stored. Examples of the storage device includes a hard disk drive and a solid-state drive (SSD).

The image forming apparatus 100 includes a control unit 300, the display 110, and the control panel 120. The image forming apparatus 100 includes the printer unit 130, the developer accommodation unit 135, the sheet accommodation unit 140, and the image reading unit 200. The image forming apparatus 100 includes a network interface 310, a first storage unit 320, and a memory 330. These functional units included in the image forming apparatus 100 are communicably connected to each other through a system bus 10.

The display 110, the control panel 120, and the printer unit 130 are described in the same manner as described above and thus will not be described. The developer accommodation unit 135, the sheet accommodation unit 140, and the image reading unit 200 are described in the same manner as described above and thus will not be described. Hereinafter, the control unit 300, the network interface 310, the first storage unit 320, and the memory 330 will be described.

The control unit 300 includes a central processing unit (CPU) of the image forming apparatus 100. The control unit 300 controls operation of each functional unit of the image forming apparatus 100. The control unit 300 performs various processes by executing programs. The control unit 300 obtains, from the control panel 120, instructions that are input by the user. The control unit 300 performs control processes based on the obtained instructions.

The network interface 310 performs data communication with another apparatus. The network interface 310 operates as an input interface and receives data that is sent from another apparatus. The network interface 310 operates as an output interface as well and sends data to another apparatus.

The first storage unit 320 is an auxiliary storage device such as a hard disk and a solid-state drive (SSD). The first storage unit 320 stores various data. The various data include, for example, registree information 321, a first guide map 322, and a second guide map 323.

The registree information 321 indicates a registration X1 of one person, or of two or more persons, who are registrees. The registree information 321 may associate one or more registrees with a state of the image forming apparatus. The registree information 321 may include identification information (ID) of the registree X1, which may include an Internet Protocol (IP) address assigned to a personal computer (PC) that the registree X1 operates.

The first guide map 322 is an image displayed on the display 110. The first guide map 322 is, for example, a map of arrangement of image forming apparatuses in the office. The map of arrangement is a guide map (map) that illustrates locations of a plurality of image forming apparatuses including the image forming apparatus 100 in the office.

The second guide map 323 is displayed on the display 110. The second guide map 323 is a guide map (map) that illustrates a storage location in the office.

The memory 330 is, for example, a random access memory (RAM). The memory 330 temporarily stores data used by each functional unit included in the image forming apparatus 100. The memory 330 may store data generated by the image reading unit 200, programs that operate each functional unit, and the like.

Functional Configuration of Control Unit

Hereinafter, a functional configuration of the control unit 300 will be described with reference to FIG. 3.

Figure 3:
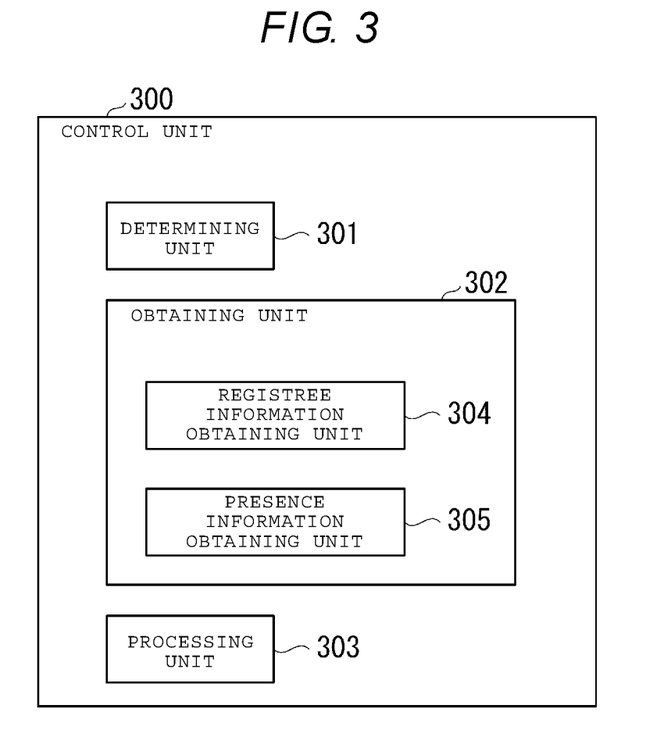
FIG. 3 is a diagram illustrating a functional configuration example of a control unit.

FIG. 3 is a diagram illustrating a functional configuration example of the control unit 300. The control unit 300 includes a hardware processor that is programmed to function as a determining unit 301, an obtaining unit 302, and a processing unit 303. The obtaining unit 302 includes a registree information obtaining unit 304 and a presence information obtaining unit 305. The program steps of each of these functional units are further described below.

The determining unit 301 determines whether or not the predetermined condition related to the state of the image forming apparatus 100 is satisfied.

The registree information obtaining unit 304 obtains, from the first storage unit 320, the registree information 321 that is stored in advance in the first storage unit 320. The registree information 321 may be stored in another server instead of the first storage unit 320. The other server is communicably connected to the image forming apparatus 100. In this case, the registree information obtaining unit 304 obtains the registree information 321 from the other server.

The presence information obtaining unit 305 obtains the presence information from a predetermined second storage unit based on the registree information 321 obtained by the registree information obtaining unit 304. The presence information indicates the presence state of the registree X1 indicated by the registree information 321. The predetermined second storage unit will be described later.

The processing unit 303 performs a different process according to the presence information obtained by the obtaining unit 302.

Flow of Process Performed by Image Forming Apparatus

Figure 4:
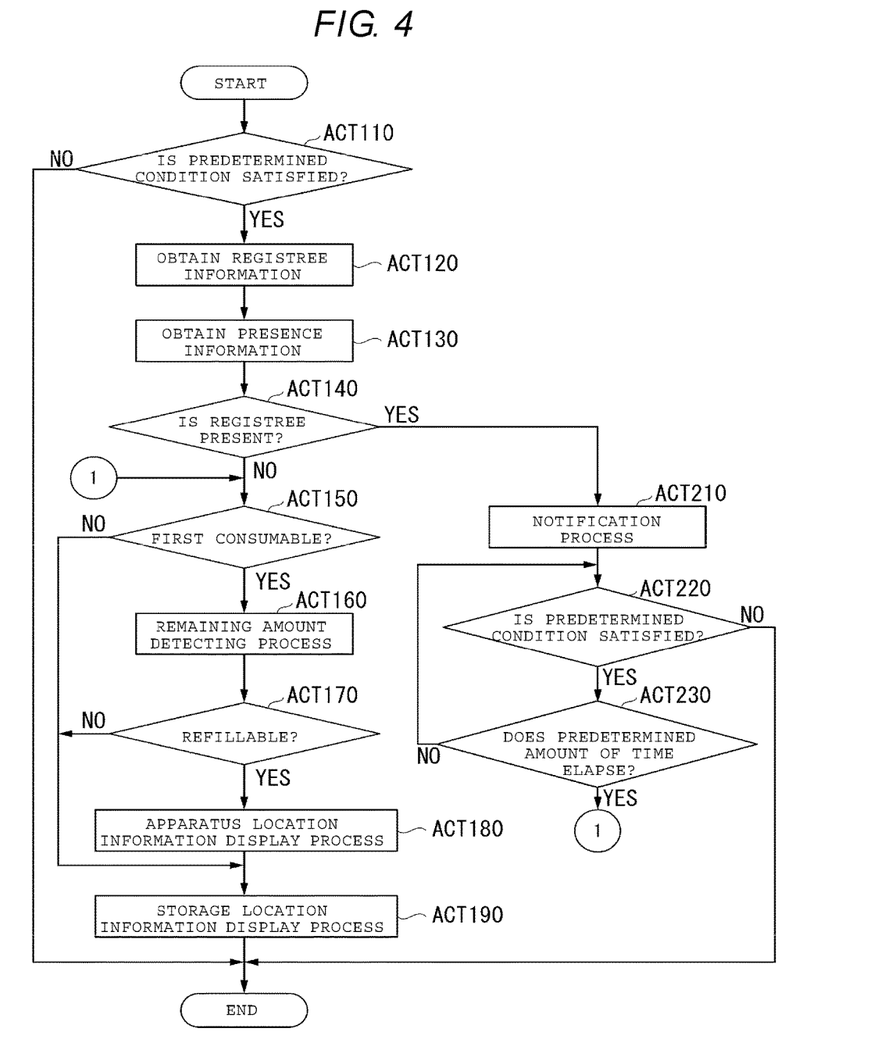
FIG. 4 is a diagram illustrating one example of the flow of a process performed by the image forming apparatus.

Hereinafter, the flow of a process performed by the image forming apparatus 100 will be described with reference to FIG. 4. FIG. 4 is a diagram illustrating one example of the flow of the process performed by the image forming apparatus 100.

The determining unit 301 obtains output values from various sensors. The various sensors in this example are one or more sensors, not illustrated, included in the image forming apparatus 100. Each of the various sensors outputs a value that indicates the state of the image forming apparatus 100. The determining unit 301 detects (or more broadly, determines) the state of the image forming apparatus 100 based on the obtained output values. The determining unit 301 determines whether or not the predetermined condition is satisfied, based on the detected state (ACT110). The process of ACT110 will be described. Hereinafter, the output values from the various sensors will be illustratively described in a case where the output values indicate whether or not the image forming apparatus 100 is in a state of requiring replacing or refilling of the consumables. That is, the output values from the various sensors in this example indicate the remaining amounts of consumables of the image forming apparatus 100. In this case, the predetermined condition is a state where the image forming apparatus 100 is in a state of requiring replacing or refilling of the consumables. The image forming apparatus 100 determines the predetermined condition to be satisfied in a case where the output values are less than a predetermined value. The image forming apparatus 100 determines the predetermined condition not to be satisfied in a case where the output values are greater than or equal to the predetermined value. The predetermined value is, for example, one and may be an integer greater than or equal to two. The output values of the various sensors may be other values that indicate the state of the image forming apparatus 100, such as values that indicate defects occurring in the apparatus or in the components included in the image forming apparatus 100. The defects include, for example, paper jam. The predetermined condition, in a case where the output values of the various sensors indicate the defects, is a state where the image forming apparatus 100 is in a state of inoperability due to the defects. The state of inoperability is a state where at least one of the functions of the image forming apparatus 100 cannot be used. Thus, the determining unit determines whether or not work needs to be performed on the image forming apparatus by a worker. Hereinafter, the processes of ACT120 to ACT230 will be illustratively described in a case where the remaining amount of a consumable D1 is less than the predetermined value.

In ACT110, the control unit 300 ends the process in a case where the determining unit 301 determines the predetermined condition not to be satisfied (NO in ACT110), so no work needs to be done by a worker on the image processing apparatus. A transition is made to ACT120 in a case where the determining unit 301 determines the predetermined condition to be satisfied (YES in ACT110), so that work needs to be done on the image forming apparatus by a worker. The registree information obtaining unit 304 obtains, from the first storage unit 320, the registree information 321 that is stored in advance in the first storage unit 320 (ACT120).

Next, the presence information obtaining unit 305 obtains, from the second storage unit, the presence information of the registree X1 indicated by the registree information 321, based on the registree information 321 (ACT130). The registree information 321 is the registree information 321 obtained by the registree information obtaining unit 304 in ACT120. The process of ACT130 will be described. The second storage unit may be a portion of a storage region of the first storage unit 320 or a portion of a storage device of a server S1 that is another server communicably connected to the image forming apparatus 100. In either case, the second storage unit stores the presence information that is correlated with target person information. The target person information indicates one or more target persons. The target person is, for example, a person working in the office. Thus, the above registree is a target person identified in the second storage unit, who is permitted to register on the image forming apparatus by the administrator. Thus, for a registree, the target person information of the second storage unit includes information that matches or correlates to the registree information. A presence information application program generates and stores the presence information in the second storage unit. The presence information application may be a dedicated application program that generates and stores the presence information. The presence information application may be an existing general-purpose application program that generates and stores the presence information, such as a schedule management tool. Hereinafter, the presence information application will be illustratively described in a case where the presence information application is installed in the image forming apparatus 100. In this case, the second storage unit is a portion of the storage region of the first storage unit 320. Specifically, the presence application is executed by the control unit 300. The second storage unit is a portion of the storage region of the server S1 in a case where the presence information application is installed in the server S1.

The presence information application, in a case where, for example, the presence information application is a schedule management tool, obtains, from a server S2, work arriving and leaving information that is correlated with the target person information of each target person. The server S2 is another server communicably connected to the image forming apparatus 100 in which the presence information application is installed. The server S2 stores the work arriving and leaving information correlated with the target person information of each target person. The work arriving and leaving information correlated with the target person information is information that indicates whether or not the target person is present at work. The work arriving and leaving information may be work arriving and leaving time that is stored in the server S2 by a time recorder. The work arriving and leaving time may include work arriving time, work leaving time, outgoing return time, and outgoing time. The outgoing return time of a target person represents the time at which the target person returns to the office from an outside destination. The outgoing time of a target person represents the time at which the target person goes out of the office to an outside destination. The presence information application determines that a target person is present in a case where the most recent work arriving or leaving time of the target person is either a work arriving time or an outgoing return time. The presence information application determines that the target person is not present in a case where the most recent work arriving or leaving time of the target person is either a work leaving time or an outgoing time. The presence information application generates the presence information based on the result of such determinations and the target person information that indicates the target person. The presence information application stores the generated presence information in the second storage unit.

The presence information application may determine the presence state of a target person based on an IP address assigned to a PC of the target person. In this case, the presence information application determines whether or not the PC is booted, based on the IP address. The presence information application determines the target person to be present in a case where the PC is determined to be booted. The presence information application determines the target person not to be present in a case where the PC is determined not to be booted.

The presence information application may perform the following processes in a case where the presence information application is a schedule management tool. In that case, the presence information application determines the presence state of a target person based on in-time operation information of the target person and schedule information of the target person. The in-time operation information indicates whether or not a PC of the target person is operated in a predetermined amount of time. The schedule information indicates the presence of a schedule of the target person at the current time. Specifically, the presence information application obtains the in-time operation information and the schedule information from the server S2. The presence information application determines the presence state of the target person based on the obtained information. The presence information application determines the target person to be present in a case where the target person does not have a schedule and where the PC is operated in the predetermined amount of time.

The presence information application may calculate the distance from a seat of a target person to the target person and determine the presence state of the target person based on the calculated distance. The seat is determined in advance in the office. In this case, the server S2 stores in advance seat information that indicates the position of the seat of the target person in the office. The presence information application obtains the seat information from the server S2. The presence information application detects the position of the target person in the office based on, for example, time that is required for communication between a portable terminal and each of a plurality of Wi-Fi (registered trademark) access points. The presence information application calculates the distance from the position indicated by the obtained seat information to the detected position of the target person in the office. The presence information application determines the presence state of the target person based on whether or not the calculated distance is less than a predetermined distance. The presence information application determines the target person to be present in a case where the calculated distance is determined to be less than the predetermined distance. The presence information application determines the target person not to be present in a case where the calculated distance is determined to be greater than or equal to the predetermined distance. The predetermined distance is, for example, three meters and may be a distance shorter than three meters or a distance longer than three meters.

The presence information application may determine the presence state of a target person using a presence sensor that is provided at the seat of the target person. The seat is determined in advance in the office. The presence sensor may be any sensor provided that the sensor can detect whether or not the target person is sitting on the seat. The presence sensor is, for example, a temperature sensor, a fingerprint verification sensor, a facial verification sensor that verifies the face of the target person, or a pressure sensor that detects pressure when the target person sits on the seat. In this case, the presence information application determines whether or not the target person is present, based on an output value from the presence sensor.

The presence information obtaining unit 305 performs the process described below when obtaining the presence information from the second storage unit in ACT130. The presence information obtaining unit 305 obtains, from the second storage unit, the presence information that is correlated with the target person information corresponding to the registree information 321. That is, the presence information indicates the presence state of the registree X1.

Next, the processing unit 303 determines whether or not the presence information indicates the presence of the registree X1 (ACT140). The presence information is obtained by the presence information obtaining unit 305 in ACT130. The processing unit 303 performs a notification process (ACT210) in a case where the presence information is determined to indicate the presence of the registree X1 (YES in ACT140). The notification process notifies the registree X1 that the predetermined condition is satisfied.

The notification process of ACT210 will be described. The processing unit 303 performs, as the notification process, a process of, for example, displaying notification information on a display of a PC of the registree X1. The notification information indicates that the predetermined condition is satisfied. In this case, the processing unit 303 causes the notification information to be displayed in a pop-up manner on the display of the PC of the registree X1. For example, the processing unit 303 sends the notification information to the PC. The PC, in a case where the PC receives the notification information, displays the received notification information in a pop-up manner on the display. The processing unit 303 may send to the PC an instruction that causes display of the notification information. In this case, a dedicated application program is installed in the PC. That is, the dedicated application program displays the notification information in a pop-up manner on the display in a case where the PC receives the instruction. Accordingly, the image forming apparatus 100 allows the maintenance work to be efficiently performed on the image forming apparatus 100 by a proper person.

The notification information includes, for example, identification information, location information, and a notification message. The notification information may include another type of information instead of a portion or the entirety of the identification, the location information, and the notification message. The notification information may include another type of information in addition to the identification information, the location information, and the notification message. The identification information identifies the image forming apparatus 100. The identification information is, for example, an IP address or a media access control (MAC) address of the image forming apparatus 100 or a name of the image forming apparatus 100. Instead, the identification information may be another type of information that can identify the image forming apparatus 100. The location information indicates the location of the image forming apparatus 100 in the office. The location information includes, for example, a map that illustrates the location. The location information may include another type of information instead of the map or may include another type of information in addition to the map. The notification message indicates that the predetermined condition is satisfied.

In ACT210, the processing unit 303 may, as the notification process, notify the notification information to a portable terminal carried by the registree X1. In this case, the first storage unit 320 stores in advance information that is required for notification of the notification information to the portable terminal, such as a mail address of the portable terminal.

The processing unit 303 may, as the notification process, cause the portable terminal to emit a ringtone a predetermined number of times. The predetermined number of times is, for example, one time and may be two or more times. In this case, the first storage unit 320 stores in advance information that is required for causing the portable terminal to emit a ringtone, such as a telephone number assigned to the portable terminal. The processing unit 303 may, as the notification process, vibrate the portable terminal for a predetermined period. The predetermined period is, for example, one minute and may be an amount of time shorter than one minute or an amount of time longer than one minute. In this case, the first storage unit 320 stores in advance information that is required for vibration of the portable terminal, such as a telephone number assigned to the portable terminal.

The determining unit 301 obtains the output values from the various sensors, not illustrated, included in the image forming apparatus 100 after the process of ACT210 is performed. The determining unit 301 detects (determines) the state of the image forming apparatus 100 based on the obtained output values. The determining unit 301 determines whether or not the predetermined condition is satisfied (i.e. work needs to be performed on the image forming apparatus by a worker), based on the detected state (ACT220). The process of ACT220 is the same as the process of ACT110 and thus will not be described. The control unit 300 determines whether work needs to be performed on the image forming apparatus 100 and ends the process in a case where the determining unit 301 determines the predetermined condition not to be satisfied (NO in ACT220). The determining unit 301 determines whether or not a predetermined amount of time elapses (ACT230). The predetermined amount of time is, for example, five minutes. The predetermined amount of time may be an amount of time less than five minutes or an amount of time greater than five minutes. The determining unit 301 transitions to ACT220 in a case where the predetermined amount of time is determined not to elapse (NO in ACT230), and determines again whether or not the predetermined condition is satisfied. That is, the determining unit 301 continues to determine whether the registree X1 has performed the maintenance work, until the predetermined amount of time elapses. The control unit 300 ends the process in a case where the determining unit 301 determines the registree X1 has performed the maintenance work before the predetermined amount of time elapses. The processing unit 303 transitions to ACT150 in a case where the determining unit 301 determines the predetermined amount of time has elapsed (YES in ACT230). The processing unit 303 determines whether or not the consumable D1 that is required to be replaced or refilled is a first consumable (ACT150). That is, the processing unit 303 determines the registree X1 to be unable to perform the maintenance work in a case where the registree X1 does not perform the maintenance work before the predetermined amount of time elapses. The processing unit 303 performs the processes of ACT150 to ACT190. The first consumable in this example is a consumable, of the consumables of the image forming apparatus 100 that can be refilled by using consumables of another image forming apparatus. The first consumable includes, for example, sheets and staples, though not limited thereto. Hereinafter, a consumable, of the consumables of the image forming apparatus 100 that cannot be refilled by using consumables of another image forming apparatus will be referred to as a second consumable for convenience of description. The second consumable includes, for example, developers and photoreceptor drums, though not limited thereto. The processing unit 303 performs a remaining amount detecting process (ACT160) in a case where the consumable D1 that is required to be replaced or refilled is determined to be the first consumable (YES in ACT150).

The remaining amount detecting process of ACT160 will be described. The processing unit 303, for example, sends a remaining amount request instruction to other nearby image forming apparatuses. The nearby image forming apparatuses are other image forming apparatuses that are communicably connected to the image forming apparatus 100. Hereinafter, the nearby image forming apparatuses will be illustratively described in a case where each of the nearby image forming apparatuses has the same configuration as the image forming apparatus 100. The nearby image forming apparatuses are image forming apparatuses indicated by apparatus information that is stored in advance in the image forming apparatus 100. The apparatus information identifies image forming apparatuses. The information is, for example, IP addresses assigned to each image forming apparatus. The information may be another type of information such as MAC addresses assigned to each image forming apparatus. The administrator stores in the first storage unit 320 the apparatus information that indicates one or more image forming apparatuses, of the image forming apparatuses existing in the office, which are determined by the administrator to be close to the image forming apparatus 100. The nearby image forming apparatuses may be one or more image forming apparatuses, of the image forming apparatuses existing in the office, that are included in a region having a predetermined radius around the image forming apparatus 100. In this case, the administrator stores, in the image forming apparatus 100, the apparatus information that indicates the image forming apparatuses. The remaining amount request instruction is an instruction that causes each of the nearby image forming apparatuses to respond with remaining amount information which indicates the remaining amount of the consumable D1. Each of the nearby image forming apparatuses sends the remaining amount information as a response to the image forming apparatus 100 in a case where each of the nearby image forming apparatuses obtains the remaining amount request instruction from the image forming apparatus 100. Accordingly, the processing unit 303 obtains the remaining amount information from each of the nearby image forming apparatuses. Each of the image forming apparatuses including the image forming apparatus 100 in the office may store the remaining amount information in a server S3, not illustrated, that stores the remaining amount information. In this case, the processing unit 303 obtains the remaining amount information from the server S3. The server S3 is communicably connected to each of the image forming apparatuses including the image forming apparatus 100 in the office. The server S3 may be located in the office or located outside of the office.

Next, the processing unit 303 determines whether or not the consumable D1 can be refilled from the nearby image forming apparatuses, based on the remaining amount information obtained in ACT160 (ACT170). The remaining amount information is obtained from each of the nearby image forming apparatuses. Specifically, the processing unit 303 determines whether or not the remaining amount information that indicates a remaining amount greater than or equal to a predetermined threshold exists in one or more of the remaining amount information obtained. The predetermined threshold is, for example, 100. The predetermined threshold may be a value smaller than 100 or a value larger than 100. The processing unit 303, in a case where one or more of the remaining amount information that indicate a remaining amount greater than or equal to the predetermined threshold are determined to exist, specifies the image forming apparatuses from which each remaining amount information is sent. The processing unit 303 determines that the consumable D1 can be refilled from the nearby image forming apparatuses (YES in ACT170), and performs an apparatus location information display process (ACT180).

The apparatus location information display process of ACT180 will be described. The processing unit 303 obtains the first guide map 322 from the first storage unit 320. The processing unit 303 displays apparatus location information that indicates the position of an image forming apparatus, in the position of the image forming apparatus in the first guide map 322 obtained on the display 110. The image forming apparatus is specified in ACT170 and is the image forming apparatus, of the nearby image forming apparatuses, in which the remaining amount of the consumable D1 is greater than or equal to the predetermined threshold. The processing unit 303, in a case where the image forming apparatus exists in plural quantities, may display the apparatus location information in each of the positions of the plurality of the image forming apparatuses in the first guide map 322. In that case, the processing unit 303 may display the apparatus location information in the position of the image forming apparatus, of the plurality of the image forming apparatuses that is closest to the image forming apparatus 100. The position is the position of the image forming apparatus in the first guide map 322. The processing unit 303 generates a guide map image based on the first guide map 322 on which the apparatus location information is displayed. The guide map image includes the first guide map 322, error information M1, and a message M2 that prompts the user to replace or refill the consumables. The error information M1 indicates that the consumable D1 is required to be replaced or refilled. The error information M1 includes, for example, information M11 that indicates the position in which the consumable D1 is accommodated in the sheet accommodation unit 140. The error information M1 includes information M12 that indicates the consumable D1, and a message M13 that indicates the absence of the registree X1. The information M12 in this example indicates the size of sheets which are the consumable D1. Instead, the information M12 may be another type of information that indicates the consumable D1. The size is, for example, A4, though not limited thereto. The guide map image may include another type of information instead of the error information M1 and the message M2. The processing unit 303 displays the generated guide map image on the display 110. The processing unit 303 performs the apparatus location information display process to display on the display 110 the first guide map 322 on which the apparatus location information is displayed. Accordingly, the image forming apparatus 100 allows the maintenance work to be efficiently performed by using the consumables of the nearby image forming apparatuses even if a proper person cannot perform the maintenance work.

Next, the processing unit 303 performs a storage location information display process (ACT190) and ends the process. The storage location information display process of ACT190 will be described. The processing unit 303 obtains, from the first storage unit 320, the second guide map 323 stored in the first storage unit 320. The processing unit 303 generates the guide map image based on the obtained second guide map 323. At this point, the processing unit 303 displays the second guide map 323 by adding the second guide map 323 to the guide map image in a case where the guide map image is previously displayed on the display 110. The guide map image is displayed on the display 110. The processing unit 303 generates the guide map image that includes the second guide map 323, the error information M1, and the message M2, in a case where the guide map image is not displayed on the display 110. The processing unit 303 displays the generated guide map image on the display 110. The image forming apparatus 100 displays the storage location on the display 110. Accordingly, the image forming apparatus 100 allows the maintenance work to be efficiently performed by using the guide map image even if a proper person cannot perform the maintenance work. The processes described heretofore that are performed by each functional unit of the control unit 300 in a case where the presence information is determined to indicate the absence of the registree X1 in ACT140 are one example of a first display process. The processes are the processes of ACT150 to ACT190.

Each functional unit of the control unit 300 performs the processes of ACT150 to ACT190 in a case where the presence information is determined to indicate the absence of the registree X1 in ACT140 (NO in ACT140). The presence information is obtained by the presence information obtaining unit 305 in ACT130. In that case, the processes of ACT150 to ACT190 performed by each functional unit are one example of a second display process.

The processing unit 303 transitions to ACT190 in a case where the consumable D1 that is required to be replaced or refilled is determined not to be a first consumable (i.e. a consumable that can be refilled by obtaining materials from nearby image processing apparatuses) in ACT150 (NO in ACT150). The processing unit 303 performs the storage location information display process and ends the process.

The processing unit 303 transitions to ACT190 in a case where the remaining amount information that indicates a remaining amount greater than or equal to the predetermined threshold is determined not to exist in ACT170 (NO in ACT170). That is, in that case, the processing unit 303 determines that the consumable D1 cannot be refilled from the nearby image forming apparatuses. The processing unit 303 transitions to ACT190, performs the storage location information display process, and ends the process.

The processing unit 303 may display the guide map image on a display of another apparatus in ACT180 described above. The other apparatus is an information processing apparatus that is communicably connected to the image forming apparatus 100, such as a PC and a portable terminal. In this case, the processing unit 303 sends the guide map image to the information processing apparatus. In that case, the processing unit 303 may send, to the information processing apparatus, an instruction to generate the guide map image. In this case, the processing unit 303 sends, to the information processing apparatus, the instruction along with information that indicates the position in which the apparatus location information is displayed in the second guide map 323. The information processing apparatus stores the first guide map 322. A dedicated application program that generates the guide map image is installed in the information processing apparatus. The application program generates the guide map image based on the instruction received from the image forming apparatus 100, the information that indicates the position, and the first guide map 322. The application program displays the generated guide map image on the display of the information processing apparatus. The application program may display the guide map image on the display in a case where an operation is performed on the information processing apparatus. The operation is an operation by the user and is an operation of printing a document. The display is one example of a second display unit.

The processing unit 303 may display the guide map image on a display of another apparatus in ACT190 described above. The other apparatus is an information processing apparatus that is communicably connected to the image forming apparatus 100, such as a PC and a portable terminal. In this case, the processing unit 303 sends the guide map image to the information processing apparatus. In that case, the processing unit 303 may send to the information processing apparatus an instruction to generate the guide map image. In this case, the processing unit 303 sends, to the information processing apparatus, the instruction along with information that indicates the position of the storage location in the second guide map 323. The information processing apparatus stores the second guide map 323. A dedicated application program that generates the guide map image is installed in the information processing apparatus. The application program generates the guide map image based on the instruction received from the image forming apparatus 100, the information that indicates the position, and the second guide map 323. The application program displays the generated guide map image on the display of the information processing apparatus. The application program may display the guide map image on the display in a case where an operation is performed on the information processing apparatus. The operation is an operation by the user and is an operation of printing a document. The display is one example of a second display unit.

Guide Map Image Example Displayed on Display 110

Figure 5:
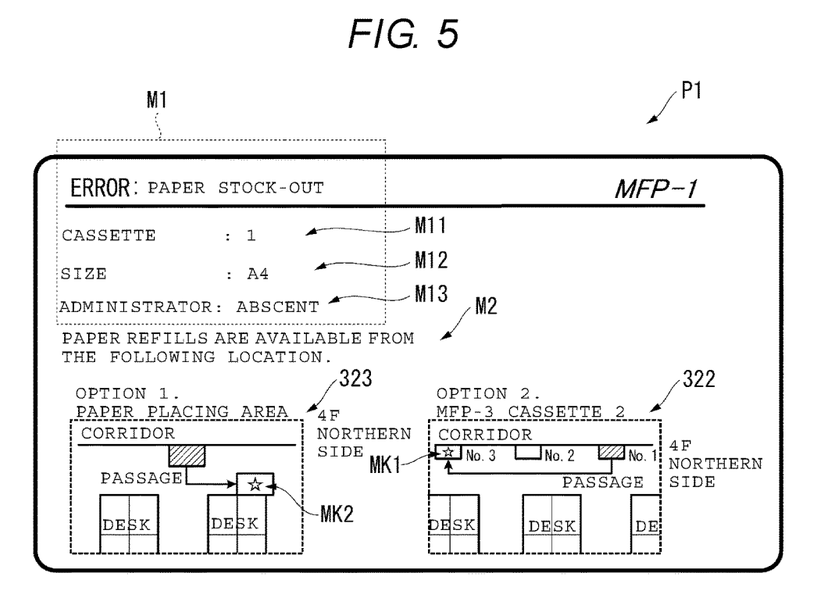
FIG. 5 is a diagram illustrating a guide map image example that is displayed on a display in an apparatus location information display process and a storage location information display process.

Hereinafter, the guide map image that is displayed on the display 110 in the apparatus location information display process and the storage location information display process will be described with reference to FIG. 5. FIG. 5 is a diagram illustrating a guide map image example that is displayed on the display 110 in the apparatus location information display process and the storage location information display process. An image P1 illustrated in FIG. 5 is one example of the guide map image. The image P1 is one example of the guide map image that includes both of the first guide map 322 and the second guide map 323. The image P1 includes the error information M1, the message M2, the first guide map 322, and the second guide map 323. The error information M1 includes the information M11, the information M12, and the message M13. The guide map image that does not include the first guide map 322 is obtained by removing the first guide map 322 from the image P1 illustrated in FIG. 5 and thus will not be described. The message M2 is the character string "paper refills are available from the following location" in FIG. 5. The information M11 is the character string "cassette: 1". The information M12 is the character string "size: A4". The message M13 is the character string "administrator: absent". Apparatus location information MK1 is displayed on the first guide map 322 included in the image P1. The apparatus location information MK1 illustrated in FIG. 5 is a star mark. The apparatus location information MK1 may be another type of information such as a circle mark, an arrow, a blinking point, and a character instead of a star mark. A hatched region in the first guide map 322 indicates the position of the image forming apparatus 100 in the first guide map 322. An arrow in the first guide map 322 illustrates a path from the position of the image forming apparatus 100 to the position of an image forming apparatus indicated by the apparatus location information MK1 in the first guide map 322. The arrow may be configured not to be displayed in the image P1. Particularly, the processing unit 303 does not display the arrow in the image P1 in a case where the image P1 is displayed on a display of another apparatus. The reason is that in that case, the arrow does not illustrate the path from the position of the other apparatus to the position of the image forming apparatus indicated by the apparatus location information MK1 in the first guide map 322. As described above, the other apparatus is an information processing apparatus that is communicably connected to the image forming apparatus 100, such as a PC and a portable terminal.

Storage location information MK2 that indicates the storage location of the consumables is displayed on the second guide map 323 included in the image P1. The storage location information MK2 illustrated in FIG. 5 is a star mark. The storage location information MK2 may be another type of information such as a circle mark, an arrow, a blinking point, and a character instead of a star mark. A hatched region in the second guide map 323 indicates the position of the image forming apparatus 100 in the second guide map 323. An arrow in the second guide map 323 illustrates a path from the position of the image forming apparatus 100 to the position of an image forming apparatus indicated by the storage location information MK2 in the second guide map 323. The arrow may be configured not to be displayed in the image P1. Particularly, the processing unit 303 does not display the arrow in the image P1 in a case where the image P1 is displayed on a display of another apparatus. The reason is that in that case, the arrow does not illustrate the path from the position of the other apparatus to the position of the image forming apparatus indicated by the storage location information MK2 in the second guide map 323. As described above, the other apparatus is an information processing apparatus that is communicably connected to the image forming apparatus 100, such as a PC and a portable terminal.

The image forming apparatus 100 according to the embodiment described heretofore includes the determining unit 301, the first storage unit 320, the obtaining unit 302, and the processing unit 303. The determining unit 301 determines whether or not the predetermined condition related to the state of the image forming apparatus 100 is satisfied. The first storage unit 320 stores the registree information that indicates a registree. The obtaining unit 302 obtains the presence information from the second storage unit that stores the presence information, in a case where the determining unit 301 determines the predetermined condition to be satisfied. The presence information indicates the presence state of the registree indicated by the registree information stored in the first storage unit. The processing unit 303 performs a different process according to the presence information obtained by the obtaining unit 302. Accordingly, the image forming apparatus 100 allows work to be efficiently performed in accordance with the state of the image forming apparatus 100 according to the presence state of a proper person.

Types of portable terminals in the above description include a multifunction portable phone terminal (smartphone), a portable phone terminal, and the like. Types of the portable terminals include a tablet terminal, a personal data assistant (PDA), and the like.

The image forming system of the embodiment may include the image forming apparatus, the server, portable terminals.

The first guide map 322 in the above description is stored in the first storage unit 320 by the administrator each time the administrator moves the image forming apparatuses in the office. In other words, the first guide map 322 as renewed is stored in the first storage unit 320 if the image forming apparatus is moved.

The first guide map 322 in the above description is stored in the first storage unit 320 by the administrator each time the administrator moves the storage location in the office. In other words, the first guide map 322 as renewed is stored in the first storage unit 320 if the storage location is moved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
    a first storage unit that stores registration information identifying at least one person as a registree registered to perform maintenance work on the image forming apparatus; and
    a processor programmed to
        determine a current operating state of the image forming apparatus based on a predetermined condition,
        obtain presence information, from a second storage unit, of the registree, the presence information indicating a presence of the registree at a predetermined location when the current operating state of the image forming apparatus is an operating state requiring maintenance work to be performed on the image forming apparatus,
        identify the registree registered to perform the required maintenance work to be done according to the current operating state of the image forming apparatus, and
        perform a notification process to notify the registree that the current operating state of the image forming apparatus requires that the maintenance work be performed when the presence information indicates the registree is present at the predetermined location.

2. The apparatus according to claim 1, wherein the predetermined condition is a state where a consumable of the image forming apparatus is required to be replaced or refilled.

3. The apparatus according to claim 2, wherein the processor is configured to perform a display process that changes a display state of a predetermined display, in a case where the processor determines that the predetermined condition still exists after a predetermined amount of time has elapsed following the notification process.

4. The apparatus according to claim 3, wherein the display process includes a process of displaying storage location information on the predetermined display, the storage location information indicating a storage location of the consumable.

5. The apparatus according to claim 3, wherein the display process includes a process of displaying a location of another image forming apparatus from which the consumable can be obtained.

6. The apparatus according to claim 1, wherein the processor is configured to perform a display process that changes a display state of a predetermined display, upon determining that none of the one or more registrees is present.

7. The apparatus according to claim 6, wherein the display process includes a process of displaying storage location information on the predetermined display, the storage location information indicating a storage location of the consumable.

8. The apparatus according to claim 6, wherein the display process includes a process of displaying a location of another image forming apparatus from which the consumable can be obtained.

9. A control method for an image forming apparatus, the method comprising:
    storing registration information in a first storage unit, the registration information identifying at least one person as a registree registered to perform maintenance work on the image forming apparatus,
    determining a current operating state of the image forming apparatus based on a predetermined condition;
    obtaining presence information, from a second storage unit, of the registree from, the presence information indicating a presence of the registree at a predetermined location when the current operating state of the image forming apparatus is an operating state requiring maintenance work to be performed on the image forming apparatus;
    identifying the registree registered to perform the required maintenance work to be done according to the current operating state of the image forming apparatus; and
    performing a notification process to notify the registree that the current operating state of the image forming apparatus requires that the maintenance work be performed when the presence information indicates the registree is present at the predetermined location.

10. The control method according to claim 9, wherein
the predetermined condition is a state where a consumable of the image forming apparatus is required to be replaced or refilled.

11. The control method according to claim 10, further comprising:
performing a display process that changes the display state of a predetermined display, in a case where the predetermined condition exists after a predetermined amount of time has elapsed following the notification process.

12. The control method according to claim 11, wherein
the display process includes a process of displaying storage location information on the predetermined display, the storage location information indicating a storage location of the consumable.

13. The control method according to claim 11, wherein
the display process includes a process of displaying a location of another image forming apparatus from which the consumable can be obtained.

14. The control method according to claim 10, wherein
performing a display process that changes a display state of a predetermined display upon determining that the registree is not present.

15. The control method according to claim 14, wherein
the display process includes a process of displaying storage location information on the predetermined display, the storage location information indicating a storage location of the consumable.

16. The control method according to claim 14, wherein
the display process includes a process of displaying a location of another image forming apparatus from which the consumable can be obtained.

17. An image forming system, comprising:
a server with a storage device that stores registree information, the registration information identifying at least one person as a registree registered to perform maintenance work on image forming apparatuses of the image forming system, wherein
at least one of the image forming apparatuses includes a processor programmed to:
  determine a current operating state of the image forming apparatus based on a predetermined condition,
  obtain presence information, from a second storage unit, of the registree, the presence information indicating a presence of the registree at a predetermined location when the current operating state of the image forming apparatus is an operating state requiring maintenance work to be performed on the image forming apparatus,
  identify the registree registered to perform the required maintenance work to be done according to the current operating state of the image forming apparatus, and
perform a notification process to notify the registree that the current operating state of the image forming apparatus requires that the maintenance work be performed when the presence information indicates the registree is present at the predetermined location.

18. The system according to claim 17, wherein
the predetermined condition is a state where a consumable of the image forming apparatus is required to be replaced or refilled.

19. The system according to claim 18, wherein
the processor is configured to perform a display process that changes a display state of a predetermined display, in a case where the processor determines that the predetermined condition still exists after a predetermined amount of time has elapsed following the notification process.

20. The system according to claim 18, wherein
the processor is configured to perform a display process that changes a display state of a predetermined display upon determining that the registree is not present.

* * * * *